US011739800B2

(12) United States Patent
Toyama et al.

(10) Patent No.: US 11,739,800 B2
(45) Date of Patent: Aug. 29, 2023

(54) AUTOMATIC TRANSMISSION

(71) Applicants: JATCO Ltd, Fuji (JP); NISSAN MOTOR CO., LTD., Yokohama (JP)

(72) Inventors: Hisashi Toyama, Fujinomiya (JP); Yuya Kimura, Fuji (JP)

(73) Assignees: JATCO LTD, Fuji (JP); NISSAN MOTOR CO., LTD., Yokohama (JP)

( * ) Notice: Subject to any disclaimer, the term of this patent is extended or adjusted under 35 U.S.C. 154(b) by 17 days.

(21) Appl. No.: 17/638,733

(22) PCT Filed: Nov. 17, 2020

(86) PCT No.: PCT/JP2020/042823
§ 371 (c)(1),
(2) Date: Feb. 25, 2022

(87) PCT Pub. No.: WO2021/106685
PCT Pub. Date: Jun. 3, 2021

(65) Prior Publication Data
US 2022/0282759 A1 Sep. 8, 2022

(30) Foreign Application Priority Data
Nov. 27, 2019 (JP) ................................ 2019-214323

(51) Int. Cl.
 *F16D 25/0638* (2006.01)
 *F16H 63/30* (2006.01)
(52) U.S. Cl.
 CPC ...... *F16D 25/0638* (2013.01); *F16H 63/3026* (2013.01); *F16H 2200/2035* (2013.01)

(58) Field of Classification Search
 CPC ............................ F16D 25/10; F16D 25/0638
 See application file for complete search history.

(56) References Cited

U.S. PATENT DOCUMENTS

| 4,713,984 | A | * | 12/1987 | Ohkubo | ................ F16H 47/085 |
| | | | | | 192/85.41 |
| 5,579,883 | A | * | 12/1996 | Tsukamoto | ......... F16H 63/3026 |
| | | | | | 192/85.41 |
| 6,213,272 | B1 | * | 4/2001 | Braford, Jr. | ............. F16D 25/10 |
| | | | | | 192/48.8 |

FOREIGN PATENT DOCUMENTS

| JP | 2000-104810 A | | 4/2000 |
| JP | 2000104810 A | * | 4/2000 |

* cited by examiner

*Primary Examiner* — Stacey A Fluhart
(74) *Attorney, Agent, or Firm* — Foley & Lardner LLP

(57) ABSTRACT

A first multi-plate brake device and a second multi-plate brake device are arranged side by side in a direction of a rotating axis X along an inner peripheral surface of a transmission case. In the second multi-plate brake device, the snap ring is supported by a supporting portion which is formed on the first multi-plate brake device side of the snap ring and protrudes from the inner peripheral surface of the transmission case radially inward to the rotating axis X. The piston retainer of the first multi-plate brake device includes an abutting portion that protrudes to the second multi-plate brake device side and abuts the supporting portion from the opposite side of the snap ring of the second multi-plate brake device. The abutting portion includes a thick portion whose radial thickness on a lower side in a vertical direction is increased as compared to on an upper side in the vertical direction based on a state of mounting the automatic transmission on a vehicle.

5 Claims, 6 Drawing Sheets

AUTOMATIC TRANSMISSION

TECHNICAL FIELD

The present invention relates to an automatic transmission.

BACKGROUND ART

In the automatic transmission disclosed by JP2000-104810A, two multi-plate brake devices are arranged side by side in a rotating axis direction along an inner peripheral surface of a transmission case.

SUMMARY OF INVENTION

A multi-plate brake device includes a plurality of frictional engagement plates and a piston that executes a stroke against the plurality of frictional engagement plates to switch between engagement and disengagement of the plurality of frictional engagement plates.

On the opposite side of the plurality of frictional engagement plates from the piston, there is provided a snap ring that regulates the movement of the piston in the rotating axis direction. The snap ring is supported by a supporting portion on the opposite side of the plurality of frictional engagement plates, and the supporting portion is formed by projecting the inner peripheral surface of the transmission case radially inward.

When the supporting portion is pushed and deformed by the piston through the snap ring, the snap ring tilts and affects the stable engagement of the frictional engagement plates, and thus, it is desirable to prevent deformation of the supporting portion. However, the supporting portion is provided between the two multi-plate brake devices, and thus, it is difficult to increase rigidity by making the supporting portion thick due to layout restrictions.

In an automatic transmission, it is required to reduce deformation of the supporting portion to stably support the snap ring.

According to an aspect of the present invention, an automatic transmission, in which a first multi-plate brake device and a second multi-plate brake device are arranged side by side in a direction of a rotating axis along an inner peripheral surface of a transmission case, is provided.

The first multi-plate brake device and the second multi-plate brake device respectively comprise:

a plurality of frictional engagement plates;

a piston, which is provided on one end side of the plurality of the frictional engagement plates in the direction of the rotating axis and executes strokes in the direction of the rotating axis; and a snap ring, which is provided on the other end side of the plurality of the frictional engagement plates in the direction of the rotating axis and regulates the movement of the plurality of the frictional engagement plates in the direction of the rotating axis.

In the first multi-plate brake device, the piston is retained by a piston retainer which is arranged on the second multi-plate brake device side of the piston and fixed to the inner peripheral surface of the transmission case.

In the second multi-plate brake device, the snap ring is supported by a supporting portion which is formed on the first multi-plate brake device side of the snap ring and protrudes from the inner peripheral surface of the transmission case radially inward to the rotating axis.

The piston retainer of the first multi-plate brake device includes an abutting portion that protrudes to the second multi-plate brake device side and abuts the supporting portion from the opposite side of the snap ring of the second multi-plate brake device.

The abutting portion includes a thick portion whose radial thickness on a lower side in a vertical direction is increased as compared to on an upper side in the vertical direction based on a state of mounting the automatic transmission on a vehicle.

According to the above aspect, an abutting portion can push back the supporting portion, which is pushed by the piston through the snap ring, by abutting the supporting portion from the opposite side of the snap ring to reduce deformation. Further, by forming a thick portion in the abutting portion on the lower side in the vertical direction of the transmission case where the supporting portion is apt to be deformed, the contact area between the abutting portion and the supporting portion can be increased. Thereby, deformation of the supporting portion can be reduced and the snap ring can be stably supported.

DESCRIPTION OF EMBODIMENTS

Hereinafter, embodiment of the present invention will be described with reference to the drawings.

Figure 1A:
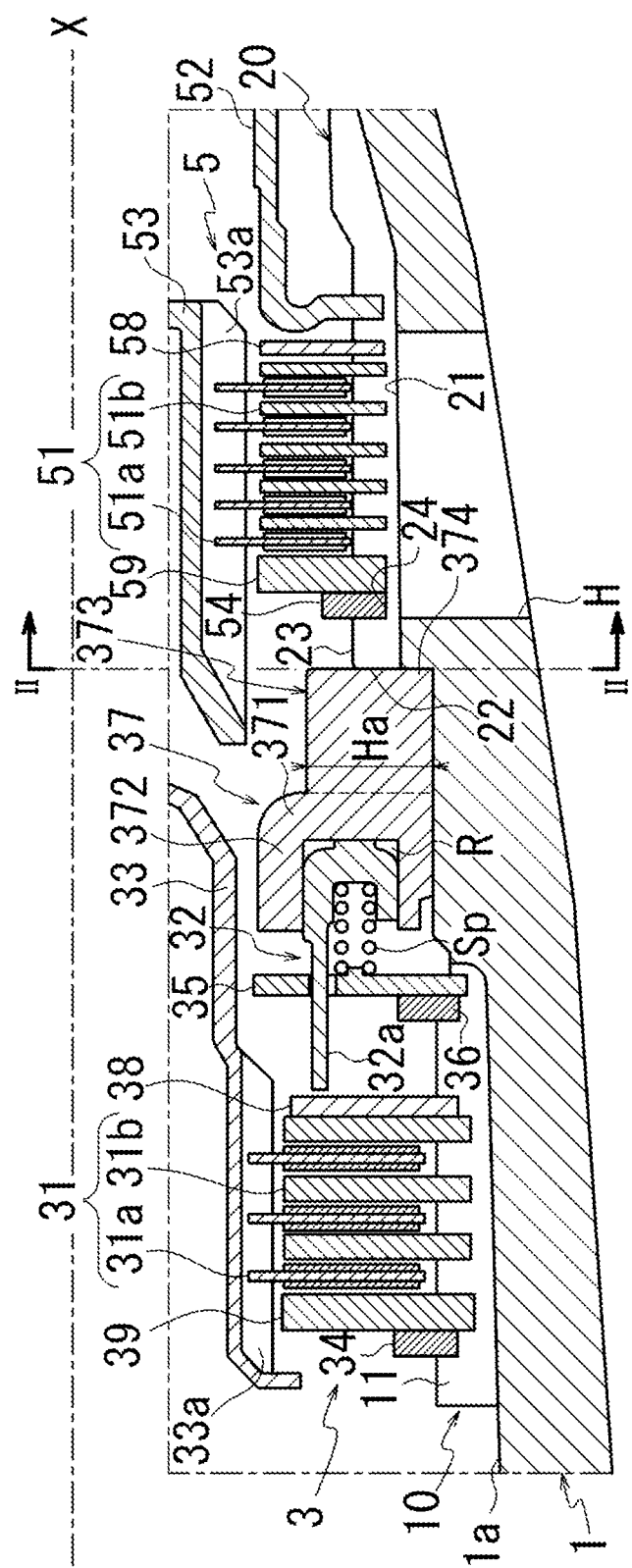
FIG. 1A is a diagram showing an automatic transmission according to an embodiment.
Figure 1B:
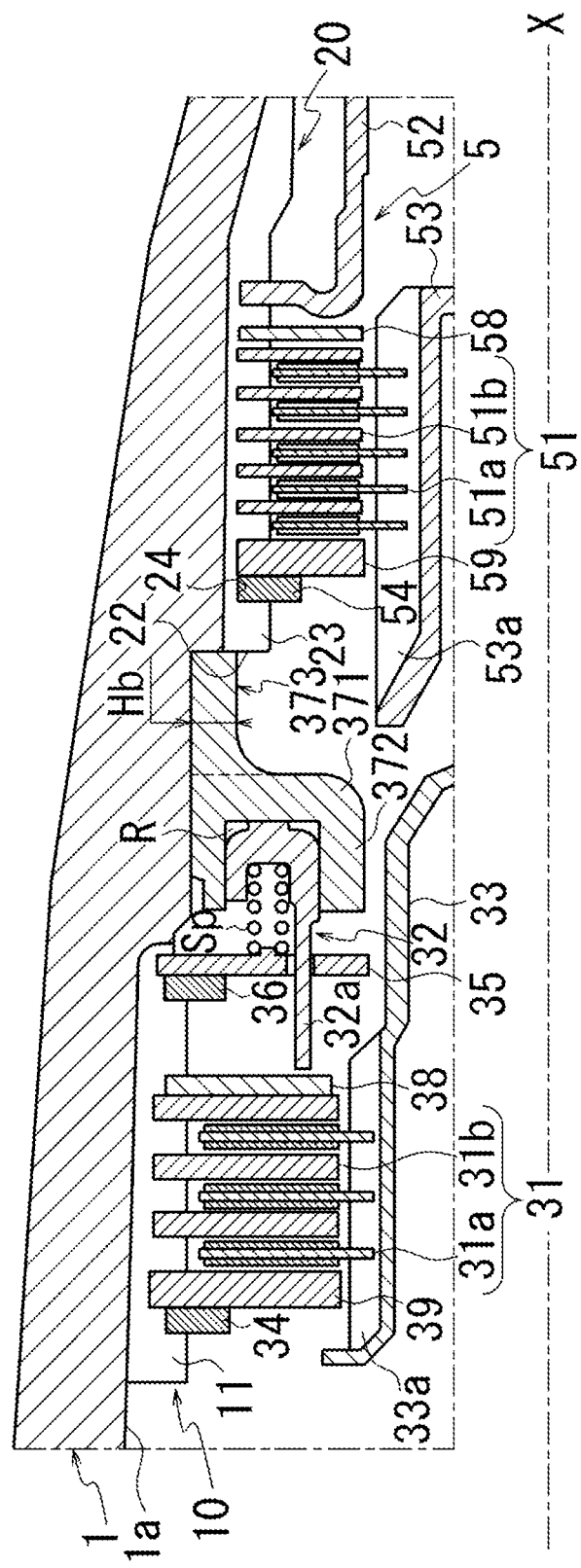
FIG. 1B is a diagram showing the automatic transmission according to the embodiment.

FIG. 1A and FIG. 1B are diagrams showing an automatic transmission according to the embodiment. FIG. 1A shows a vicinity of multi-plate brake devices below a rotating axis X of a transmission case 1 in the vertical direction based on the state of mounting the automatic transmission on a vehicle, and FIG. 1B shows a vicinity of the multi-plate brake devices above the rotating axis X in the vertical direction.

Figure 2:
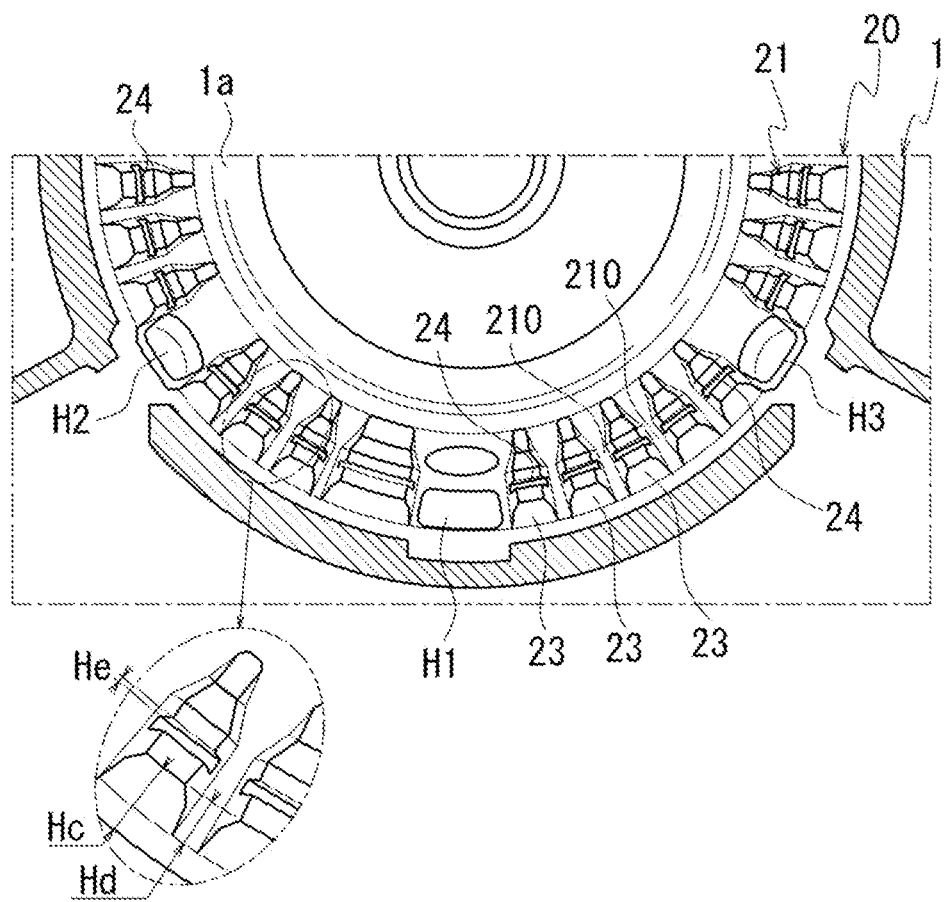
FIG. 2 is a cross-sectional view of the transmission case along a line II-II of FIG. 1A.

FIG. 2 is a cross-sectional view of the transmission case 1 along the line II-II of FIG. 1A. In FIG. 2, the parts housed inside the transmission case 1 are omitted. Further, FIG. 2 exaggerates supporting portions 23 and ring-shaped grooves 24 in illustration.

As shown in FIG. 1A, in the automatic transmission of the embodiment, a multi-plate brake device 3 and a multi-plate brake device 5 are arranged side by side in the direction of the rotating axis X along an inner peripheral surface 1a of the transmission case 1.

The multi-plate brake device 3 and the multi-plate brake device 5 are arranged on a stepped portion 10 and a stepped portion 20 where the inner peripheral surface 1a of the transmission case 1 is projected inward in the radial direction of the rotating axis X, respectively. The stepped portions 10 and 20 are step-like, and the stepped portion 20 projects more radially inward than the stepped portion 10 does.

Spline portions 11 and 21 are formed in the stepped portion 10 and the stepped portion 20, respectively.

As shown in FIG. 2, the spline portion 21 is composed of a plurality of axial grooves 210 extending in the direction of the rotating axis X. The plurality of axial grooves 210 are arranged on the inner peripheral surface 1a of the transmission case 1 at intervals in the circumferential direction of the rotating axis X. Each axial groove is formed by digging the stepped portion 20 from the top to the bottom side. Further, FIG. 2 illustrates the spline portion 21 of the stepped portion 20, and the spline portion 11 of the stepped portion 10 is similarly composed of a plurality of axial grooves, although not illustrated.

As shown in FIG. 1A, the multi-plate brake device 3 includes frictional engagement plates 31 and a piston 32 arranged side by side in the direction of the rotating axis X with respect to the frictional engagement plates 31. The frictional engagement plates 31 include annular drive plates 31a and driven plates 31b alternately arranged in the direction of the rotating axis X. A disc spring 38 is arranged on the piston side of the frictional engagement plates 31, and an end plate 39 is arranged on the opposite side to the piston side.

A clutch drum 33, which is a rotating body, is arranged on the inner peripheral side of the drive plates 31a. A spline 33a is provided on the outer periphery of the clutch drum 33, and the drive plates 31a are slidably fitted to the spline 33a of the clutch drum 33 in the direction of the rotating axis X. The driven plates 31b are slidably fitted to the spline portion 11 provided in the stepped portion 10 in the direction of the rotating axis X. The disc spring 38 is slidably provided on the spline portion 11 in the direction of the rotating axis X, similar to the driven plates 31b.

The end plate 39 fits into the spline portion 11 and is positioned by a snap ring 34 on the side opposite to the side of the frictional engagement plates 31. The end plate 39 and snap ring 34 regulate the sliding of the frictional engagement plates 31 in the direction of the rotating axis X.

A spring retainer 35 is arranged between the piston 32 and the frictional engagement plates 31. An arm 32a that pushes the frictional engagement plates 31 protrudes from the piston 32, penetrates the spring retainer 35, and extends toward the frictional engagement plates 31.

The spring retainer 35 is positioned in the direction of the rotating axis X by a snap ring 36.

A spring Sp is retained by the spring retainer 35 and piston 32. One end of the spring Sp is retained by the spring retainer 35 and the other end is retained by the piston 32. The spring Sp biases the piston 32 in the direction away from the frictional engagement plates 31 (the right direction in the figure).

The piston 32 is slidably retained in the direction of the rotating axis X by a piston retainer 37. The piston retainer 37 has a holding portion 372, which is for the piston 32, formed on one end side of an annular wall portion 371 and a cylindrical abutting portion 373 formed on the opposite side. A hydraulic chamber R for sliding the piston 32 is formed in the holding portion 372. When a hydraulic pressure is supplied to the hydraulic chamber R, the piston 32 slides toward the frictional engagement plates 31 along the direction of the rotating axis X, and the arm 32a pushes the frictional engagement plates 31 to engage the drive plates 31a with the driven plates 31b. This regulates the rotation of the clutch drum 33 to which the drive plates 31a are spline-fitted.

When a hydraulic pressure is discharged from the hydraulic chamber R, the arm 32a of the piston 32 is separated from the frictional engagement plates 31 by the biasing force of the spring Sp, and the piston 32 returns to the initial position. This disengages the drive plates 31a from the driven plates 31b and allows the clutch drum 33 to rotate.

The tip of the abutting portion 373 of the piston retainer 37 abuts an end surface 22 of the stepped portion 20, and thereby, the piston retainer 37 is positioned in the direction of the rotating axis X.

As shown in FIG. 1A and FIG. 1B, the radial thickness of the abutting portion 373 of the piston retainer 37 is not constant, and the radial thickness Ha in the vertical direction below the rotating axis X is set to be larger than the radial thickness Hb in the vertical direction above the rotating axis X. That is, a thick portion 374 is provided on a lower side of the abutting portion 373 of the piston retainer 37 in the vertical direction. The details and actions of the thick portion 374 will be described later.

Like the multi-plate brake device 3, the multi-plate brake device 5 has frictional engagement plates 51 including drive plates 51a and driven plates 51b, and a piston 52 arranged side by side in the direction of the rotating axis X with respect to the frictional engagement plates 51. A disc spring 58 is arranged on the piston 52 side of the frictional engagement plates 51, and an end plate 59 is arranged on the opposite side to the piston side.

In the multi-plate brake device 5, a clutch drum 53, which is a rotating body, is arranged on the inner peripheral side of the drive plates 51a, and a spline 53a is provided on the outer periphery of the clutch drum 53. The drive plates 51a are fitted to the spline 53a on the inner peripheral side. The driven plates 51b are fitted to the spline portion 21 provided in the stepped portion 20. The drive plates 51a are slidably fitted to the spline 53a of the clutch drum 53 in the direction of the rotating axis X.

Although not illustrated, the piston 52 is retained by a piston retainer and is provided to be slidable in the direction of the rotating axis X by a hydraulic pressure supplied to a hydraulic chamber formed between the piston 52 and the piston retainer. In addition, the piston 52 is biased in the direction away from the frictional engagement plates 51 by an unillustrated spring.

When a hydraulic pressure is supplied to the unillustrated hydraulic chamber, the piston 52 slides toward the frictional engagement plates 51 along the direction of the rotating axis X, and pushes the frictional engagement plates 51 through the disc spring 58 to engage the drive plates 51a with the driven plates 51b. This regulates the rotation of the clutch drum 53 to which the drive plates 51a are spline-fitted.

When a hydraulic pressure is discharged from the unillustrated hydraulic chamber, the piston 52 is separated from the frictional engagement plates 51 by the biasing force of the unillustrated spring, and returns to the initial position. This disengages the drive plates 51a from the driven plates 51b and allows the clutch drum 53 to rotate.

The end plate 59 fits into the spline portion 21 and is positioned by a snap ring 54 on the side opposite to the side of the frictional engagement plates 51. The end plate 59 and snap ring 54 regulate the sliding of the frictional engagement plates 51 in the direction of the rotating axis X.

The snap ring 54 fits into the ring-shaped grooves 24 formed near the end surface 22 of the stepped portion 20. That is, the portions of the stepped portion 20, which are defined by the end surface 22 and the ring-shaped grooves 24, act as the supporting portions 23 that support the snap ring 54. As described above, the abutting portion 373 of the piston retainer 37 of the multi-plate brake device 3 abuts the end surface 22, and thus, the supporting portions 23 also serve for positioning of the piston retainer 37.

As shown in FIG. 2, the ring-shaped grooves 24 are formed in an annular shape so as to cross the stepped portion 20 in the circumferential direction while being orthogonal to the axial grooves 210 constituting the spline portion 21.

The dimensions of the axial grooves 210 and the ring-shaped grooves 24 are appropriately set according to the dimensions of the driven plates 51b and the snap ring 54 to be fitted, and in the illustrated example, the radial depth Hd of the axial grooves 210 is set smaller than the radial thickness Hc of the stepped portion where the axial grooves 210 are formed. Further, the radial depth He of the ring-shaped grooves 24 is set smaller than the radial depth Hd of the axial grooves 210.

Further, a plurality of oil holes H1, H2, and H3 are formed in the stepped portion 20. The oil holes H1, H2, and H3 are through holes formed to drain the lubricating oil supplied to the inside of the transmission case 1 to an oil pan (unillustrated) provided at the bottom of the transmission case 1.

The oil supplied to the inside of the transmission case 1 is scraped up by the rotating body constituting the transmission mechanism, and then falls downward in the vertical direction due to gravity. Therefore, the oil holes H1, H2, and H3 for draining the dropped oil to the oil pan are formed in a portion below the rotating axis X of the transmission case 1 in the vertical direction. The number and position of oil holes are not limited, and in the illustrated example, the oil hole H1 is provided at the very bottom of the transmission case 1 in the vertical direction, and the oil holes H2 and H3 are provided at 2 locations above the oil hole H1 in the vertical direction. The support portions 23 have been cut off from a portion of the transmission case 1 where the oil holes H1, H2, and H3 are formed.

Figure 3:
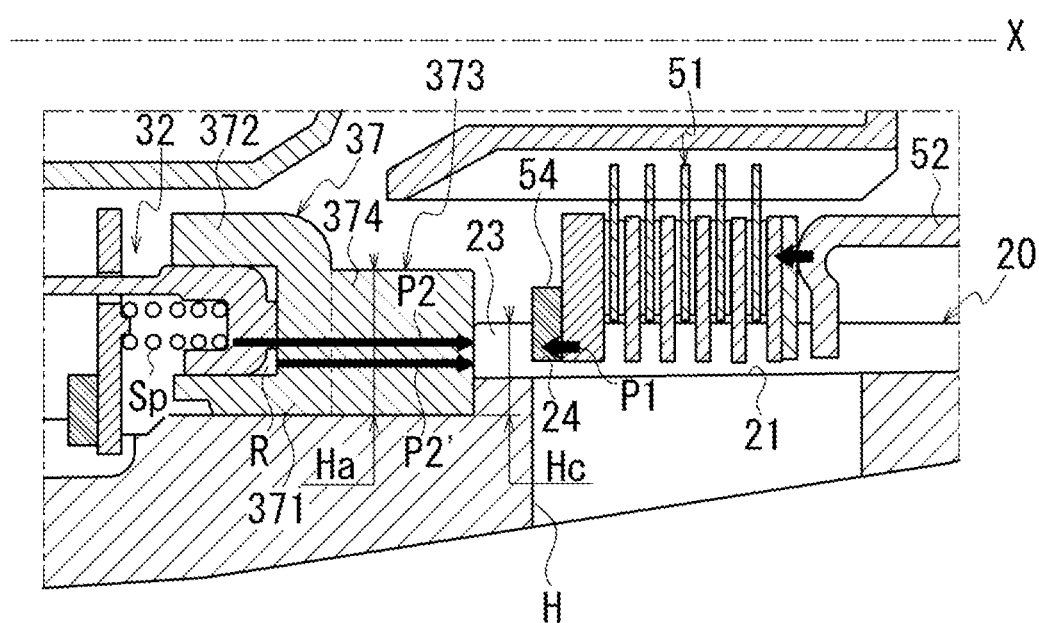
FIG. 3 is a diagram illustrating a pressure applied to a supporting portion.

FIG. 3 is a diagram illustrating the pressure received by the supporting portion 23.

As shown in FIG. 3, when the frictional engagement plates 51 are engaged, a pressure P1 is applied to the snap ring 54 of the multi-plate brake device 5 toward the multi-plate brake device 3 in the direction of the rotating axis X due to the pushing force of the piston 52. The snap ring 54 is fitted to the ring-shaped grooves 24, and thus, the pressure P1 is applied to the supporting portions 23 via the snap ring 54.

It is desirable to increase the rigidity of the supporting portions 23 in order to prevent the supporting portions 23 from tilting toward the multi-plate brake device 3 due to the pressure P1, but recently, there has been a tendency of using materials such as magnesium alloys for the transmission case 1 for weight reduction, and it may be difficult to increase the rigidity of the supporting portions 23 from the aspect of material. Further, the supporting portions 23 are formed between the multi-plate brake device 3 and the multi-plate brake device 5, and it is difficult to ensure rigidity by thickening the supporting portions 23 in the direction of the rotating axis X or in the radial direction due to layout restrictions.

Further, as described above, the supporting portions 23 have been cut off at the portions of the oil holes H1-H3 provided at the bottom in the vertical direction of the transmission case 1, and thus, stress due to the influence of the pressure P1 tends to concentrate on the supporting portions 23 around the portions of the oil holes H1-H3. If the supporting portions 23 are deformed under the pressure P1 and tilt toward the multi-plate brake device 3, the snap ring 54 may tilt and affect the stable engagement of the frictional engagement plates 51. In addition, cracks may occur in the supporting portions 23 around the oil holes H1-H3 of the transmission case 1.

Here, as described above, the abutting portion 373 of the piston retainer 37 of the multi-plate brake device 3 abuts the end surface 22 of the stepped portion 20. That is, the abutting portion 373 of the piston retainer 37 abuts the supporting portion 23 from the opposite side of the snap ring 54.

Further, pressures P2 and P2' are applied to the piston retainer 37 of the multi-plate brake device 3 when the frictional engagement plates 31 are disengaged and engaged, respectively.

First, when the frictional engagement plates 31 are disengaged, the pressure P2 is applied toward the multi-plate brake device 5 in the direction of the rotating axis X due to the biasing force of the spring Sp. The abutting portion 373 of the piston retainer 37 abuts the supporting portions 23, and thus, the pressure P2 is applied to the supporting portions 23 via the abutting portion 373. The pressure P2 is a force in the opposite direction to the pressure P1, and thus pushes the supporting portions 23, which tilt toward the multi-plate brake device 3 due to the pressure P1, back toward the multi-plate brake device 5. In this way, the pressures P1 and P2, which are forces in opposite directions from two ends, act on the supporting portions 23 to reduce the tilt of the supporting portions 23.

Further, when the frictional engagement plates 31 are engaged, the pressure P2' occurs in the hydraulic chamber R. When the piston 32 is moved toward the snap ring 34 and the engagement of the frictional engagement plates 31 is completed, the piston retainer 37 of the multi-plate brake device 3 is pushed back toward the supporting portions 23 by the pressure P2'. The abutting portion 373 of the piston retainer 37 abuts the supporting portions 23, and thus, the pressure P2' is applied to the supporting portions 23 through the abutting portion 373. The pressure P2' is a force in the opposite direction to the pressure P1, and thus pushes the supporting portions 23, which tilt toward the multi-plate brake device 3 due to the pressure P1, back toward the multi-plate brake device 5. In this way, the pressures P1 and P2', which are forces in opposite directions from two ends, act on the supporting portions 23 to reduce the tilt of the supporting portions 23.

In the embodiment, the thick portion 374 is provided on the abutting portion 373 of the piston retainer 37 to further reduce the tilt at the locations where cracks are apt to occur due to the provision of the oil holes H1-H3, specifically, on the lower side in the vertical direction from the rotating axis X of the transmission case 2.

Figure 4:
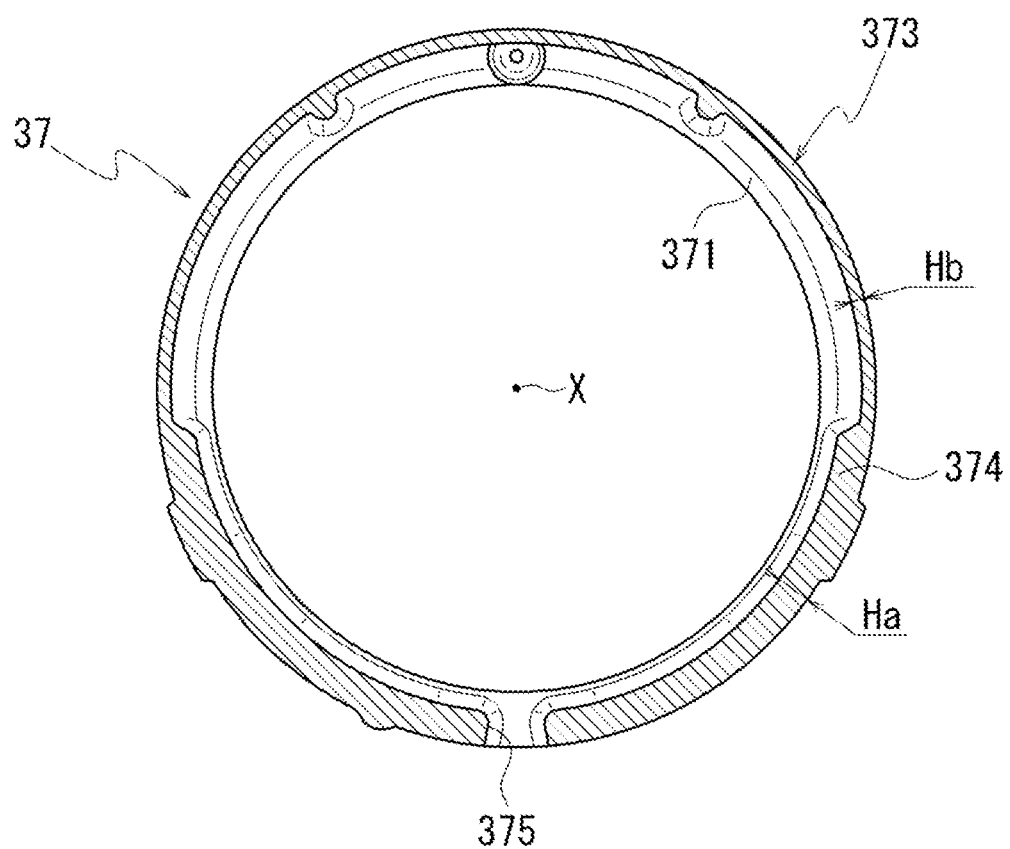
FIG. 4 is a diagram showing an abutting portion of a piston retainer.

FIG. 4 is a diagram showing the abutting portion 373 of the piston retainer 37, and is a diagram of the piston retainer 37 viewed from the multi-plate brake device 5 side in the direction of the rotating axis X.

Figure 5:
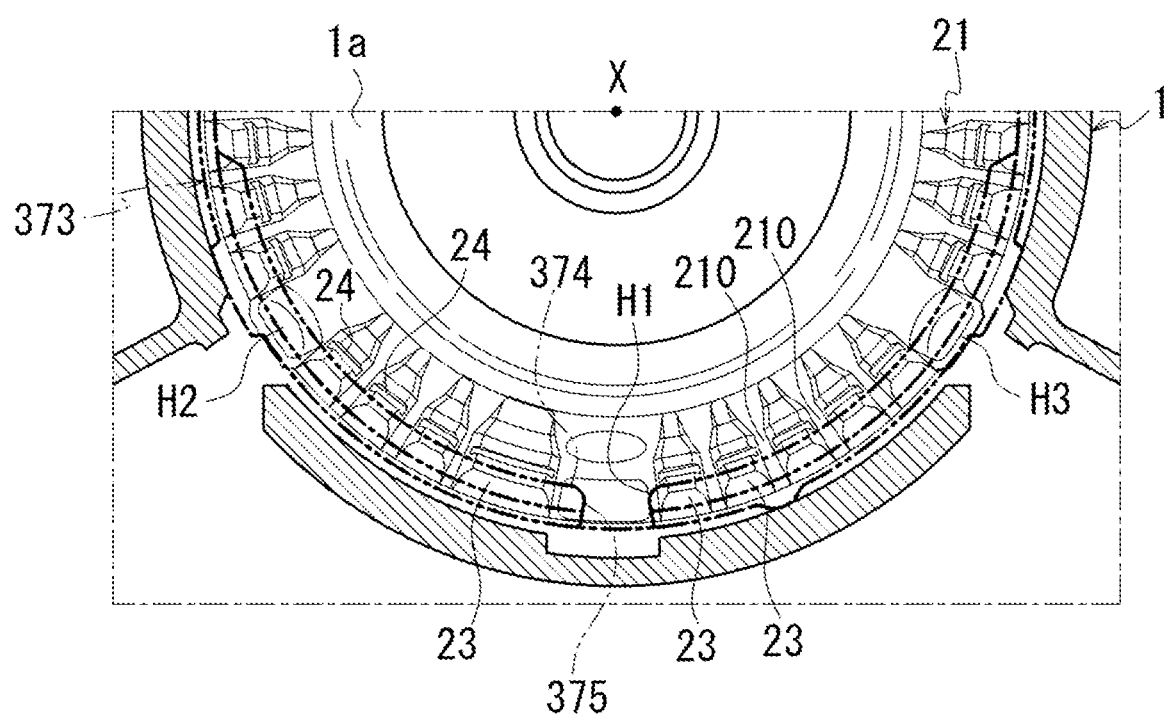
FIG. 5 is a diagram showing the correspondence between the supporting portion of the transmission case and the piston retainer.

FIG. 5 is a diagram showing the correspondence between the abutting portion 373 and the supporting portions 23. FIG. 5 shows the abutting portion 373 of the piston retainer 37 by virtual lines in a cross-sectional view of the transmission case 1 similar to FIG. 2.

As shown in FIG. 4, the abutting portion 373 is formed in an annular shape along the outer circumference of the wall portion 371 of the piston retainer 37. A semicircular thick portion 374 is formed in a portion of the abutting portion 373 below the rotating axis X in the vertical direction. The radial thickness Ha of the thick portion 374 is set to be larger than the radial thickness Hb in the vertical direction above the rotating axis X. At the very bottom of the thick portion 374 in the vertical direction, an oil drain portion 375 is formed by partially cutting away the thick portion 374 so that oil does not stay on the inner circumference of the abutting portion 373. As shown in FIG. 5, the oil drain portion 375 is formed at a position corresponding to the oil hole H1 formed in the transmission case 1.

As shown in FIG. 3, the radial thickness Ha of the thick portion 374 is set to be equal to or higher than the radial thickness Hc of the supporting portions 23. Thus, the abutting portion 373 has a larger contact area with the supporting portions 23 below the rotating axis X in the vertical direction than above the rotating axis X in the vertical direction (referring to FIG. 1B), and the pressures P2 and P2' for pushing back the pressure P1 are easily transmitted from the abutting portion 373 to the supporting portions 23.

As shown in FIG. 5, the thick portion 374 overlaps the oil holes H2 and H3 when viewed from the direction of the rotating axis X. Thus, the pressures P2 and P2' are easily applied from the thick portion 374 to the supporting portions 23 around the oil holes H2 and H3 where the pressure P1 is concentrated and cracks are apt to occur, and the tilt is reduced.

Further, the thick portion 374 is formed in a manner of straddling a plurality of axial grooves 210 constituting the spline portion 21 when viewed from the direction of the rotating axis X. When the supporting portions 23 are deformed, cracks are apt to occur starting from between the axial grooves 210 and the supporting portions 23. Thus, by forming the thick portion 374 in a manner of straddling a plurality of axial grooves 210, it is possible to effectively prevent the tilt and easily prevent the occurrence of cracks.

As described above, in the automatic transmission of the embodiment, (1) the multi-plate brake device 3 (first multi-plate brake device) and the multi-plate brake device 5 (second multi-plate brake device) are arranged side by side in the direction of the rotating axis X along the inner peripheral surface 1a of the transmission case 1.

The multi-plate brake device 3 and the multi-plate brake device 5 respectively include:

the plurality of the frictional engagement plates 31, 51;

the pistons 32, 52, which are respectively provided on one end side of the plurality of the frictional engagement plates 31, 51 in the direction of the rotating axis X and execute strokes in the direction of the rotating axis X; and the snap rings 34, 54, which are respectively provided on the other end side of the plurality of the frictional engagement plates 31, 51 in the direction of the rotating axis X and regulate the movement of the frictional engagement plates 31, 51 in the direction of the rotating axis X, wherein in the multi-plate brake device 3, the piston 32 is retained by the piston retainer 37 which is arranged on the multi-plate brake device 5 side of the piston 32 and fixed to the inner peripheral surface 1a of the transmission case 1, in the multi-plate brake device 5, the snap ring 54 is supported by the supporting portions 23 which are formed on the multi-plate brake device 3 side of the snap ring 54 and protrude from the inner peripheral surface 1a of the transmission case 1 radially inward to the rotating axis X, and the piston retainer 37 of the multi-plate brake device 3 includes the abutting portion 373 that protrudes to the side of the multi-plate brake device 5 and abuts the supporting portions 23 from the opposite side of the snap ring 54 of the multi-plate brake device 5; and the abutting portion 373 includes the thick portion 374 whose radial thickness on the lower side in the vertical direction is increased as compared to on the upper side in the vertical direction based on the state of mounting the automatic transmission on a vehicle.

The abutting portion 373 of the piston retainer 37 of the multi-plate brake device 3 abuts on the supporting portions 23 from the opposite side of the snap ring 54, and thereby, the pressure P2 or P2', which pushes back the pressure P1 applied to the supporting portions 23 via the snap ring 54, is applied to the supporting portions 23. Thereby, it is possible to prevent the supporting portions 23 from deforming and tilting toward the multi-plate brake device 3 due to the pressure P1, and the supporting portions 23 can stably support the snap ring 54, and thus, the stable engagement of the frictional engagement plates 51 can be maintained.

Further, the supporting portions 23 are prone to deformation on the lower side in the vertical direction, and thus, by forming the thick portion 374 on the lower side in the vertical direction of the abutting portion 373, the contact area between the abutting portion 373 and the supporting portions 23 can be increased, and the stability of the supporting portions 23 can be enhanced.

(2) The multi-plate brake device 5 is arranged on the stepped portion 20 formed by projecting the inner peripheral surface 1a of the transmission case 1 inward in the radial direction of the rotating axis X, the ring-shaped grooves 24 (groove portion), into which the snap ring 54 of the multi-plate brake device 5 fits, are formed near the end surface 22 (end portion) on the multi-plate brake device 3 side of the stepped portion 20, the supporting portions 23 are the parts defined by the end surface 22 and the ring-shaped grooves 24 of the stepped portion 20, and the abutting portion 373 of the piston retainer is abutted and positioned on the end surface 22, and the thick portion 374 of the abutting portion 373 has the radial thickness Ha that is equal to or greater than the radial thickness Hc of the supporting portions 23 which the thick portion 374 abuts.

With such a configuration, the supporting portions 23 can both support the snap ring 54 and position the piston retainer 37, and can achieve space saving and reduction of the number of parts in the transmission case where the layout is severely restricted. Further, by setting the radial thickness Ha of the thick portion 374 to be equal to or greater than the radial thickness Hc of the supporting portions 23, the abutting portion 373 comes into full contact with the supporting portions 23, and thus, it becomes easier for the pressure P2 or P2' to be transmitted evenly to the supporting portions 23, and it becomes easier to push back the pressure P1 to reduce the tilt of the supporting portions 23.

(3) The oil holes H2 and H3, which are for draining the lubricating oil which lubricates the inside of the transmission case 1, are provided on the inner peripheral surface 1a of the transmission case 1 and below the rotating axis X in the vertical direction by partially excising the supporting portions 23, and the thick portion 374 is formed at a position corresponding to the oil holes H2 and H3 when viewed from the direction of the rotating axis X.

By providing the thick portion 374 of the abutting portion 373 at a position corresponding to the oil holes H2 and H3, it is possible to apply the pressure P2 or P2' which pushes back the pressure P1 and to reduce the tilt at the locations where the support portions 23 are apt to tilt.

(4) The thick portion 374 is formed in a manner of overlapping the oil holes H2 and H3 when viewed from the direction of the rotating axis X.

By providing the thick portion 374 in a manner of overlapping the oil holes H2 and H3, it is possible to apply the pressure P2 or P2' which pushes back the pressure P1 and to reduce the tilt at the locations where the support portions 23 are apt to tilt.

(5) In the stepped portion 20, which is the region where the multi-plate brake device 5 is arranged on the inner peripheral surface 1a of the transmission case 1, a plurality of the axial grooves 210 extending in the direction of the rotating axis X are formed at intervals in the circumferential direction of the rotating axis X, the supporting portions 23 are formed among the axial grooves 210, and the thick portion 374 is formed to straddle a plurality of the axial grooves 210 when viewed from the direction of the rotating axis X.

The supporting portions 23 are formed among the axial groove 210, and thus, when the supporting portions 23 are deformed, cracks are apt to occur starting from between the axial grooves 210 and the supporting portions 23. Thus, by forming the thick portion 374 in a manner of straddling a plurality of axial grooves 210, it is possible to effectively prevent the tilt and easily prevent the occurrence of cracks.

The present application claims a priority under Japanese Patent Application No. 2019-214323 filed to Japan Patent Office on Nov. 27, 2019, and an entire content of this application are incorporated herein by reference.

The invention claimed is:

1. An automatic transmission, in which a first multi-plate brake device and a second multi-plate brake device are arranged side by side in a direction of a rotating axis along an inner peripheral surface of a transmission case, wherein:
  the first multi-plate brake device and the second multi-plate brake device respectively comprise:
  a plurality of frictional engagement plates;
  a piston, which is provided on one end side of the plurality of the frictional engagement plates in the direction of the rotating axis and executes strokes in the direction of the rotating axis; and
  a snap ring, which is provided on the other end side of the plurality of the frictional engagement plates in the direction of the rotating axis and regulates the movement of the plurality of the frictional engagement plates in the direction of the rotating axis, wherein,
  in the first multi-plate brake device, the piston is retained by a piston retainer which is arranged on the second multi-plate brake device side of the piston and fixed to the inner peripheral surface of the transmission case,
  in the second multi-plate brake device, the snap ring is supported by a supporting portion which is formed on the first multi-plate brake device side of the snap ring and protrudes from the inner peripheral surface of the transmission case radially inward to the rotating axis, and
  the piston retainer of the first multi-plate brake device includes an abutting portion that protrudes to the second multi-plate brake device side and abuts the supporting portion from the opposite side of the snap ring of the second multi-plate brake device; and
  the abutting portion includes a thick portion whose radial thickness on a lower side in a vertical direction is increased as compared to on an upper side in the vertical direction based on a state of mounting the automatic transmission on a vehicle.

2. An automatic transmission according to claim 1, wherein:
  the second multi-plate brake device is arranged on a stepped portion formed by projecting the inner peripheral surface of the transmission case inward in the radial direction of the rotating axis;
  a groove portion, into which the snap ring of the second multi-plate brake device fits, is formed near an end portion on the first multi-plate brake device side of the stepped portion;
  the supporting portion is a part defined by the end portion and the groove portion of the stepped portion, and the abutting portion of the piston retainer is abutted and positioned on the end portion; and
  the thick portion of the abutting portion has a radial thickness that is equal to or greater than a radial thickness of the supporting portion.

3. An automatic transmission according to claim 1, wherein:
  an oil hole, which is for draining lubricating oil which lubricates the inside of the transmission case, is provided on the inner peripheral surface of the transmission case and below the rotating axis in a vertical direction by partially excising the supporting portion; and
  the thick portion is formed at a position corresponding to the oil hole when viewed from the direction of the rotating axis.

4. An automatic transmission according to claim 3, wherein:
  the thick portion is formed in a manner of overlapping the oil hole when viewed from the direction of the rotating axis.

5. An automatic transmission according to claim 1, wherein:
  a plurality of axial grooves extending in the direction of the rotating axis are formed at intervals in the circumferential direction of the rotating axis in a region where the second multi- plate brake device is arranged on the inner peripheral surface of the transmission case;
  the supporting portion is formed among the axial grooves; and
  the thick portion is formed to straddle a plurality of the axial grooves when viewed from the direction of the rotating axis.

* * * * *